No. 880,592. PATENTED MAR. 3, 1908.
R. H. STERLING.
LONG DISTANCE RECORDING INDICATOR FOR RECIPROCATING DEVICES.
APPLICATION FILED SEPT. 29, 1905.
2 SHEETS—SHEET 2.
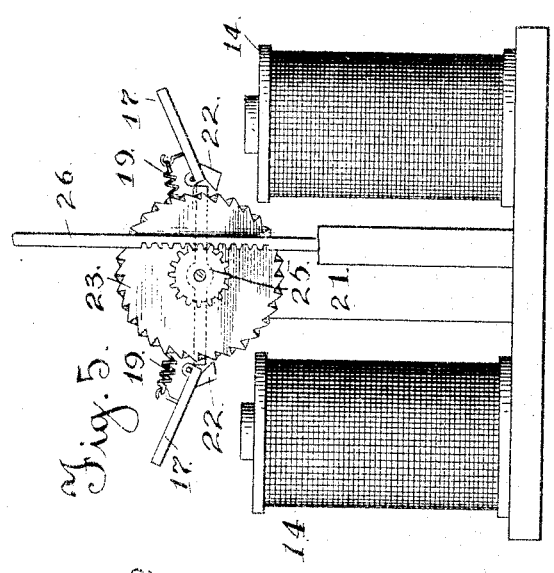
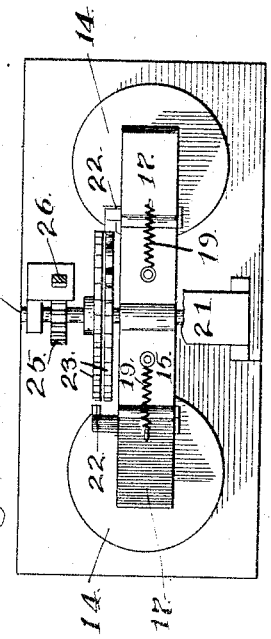
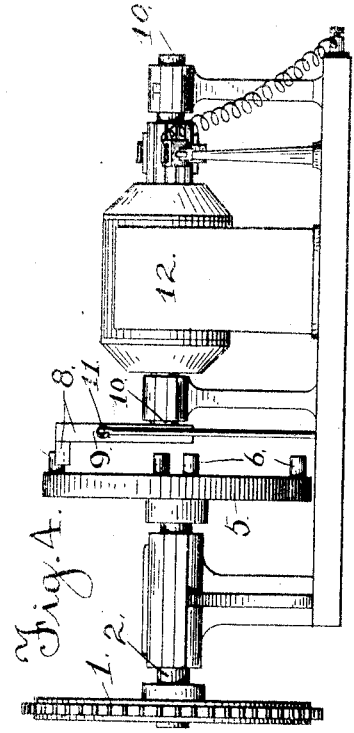
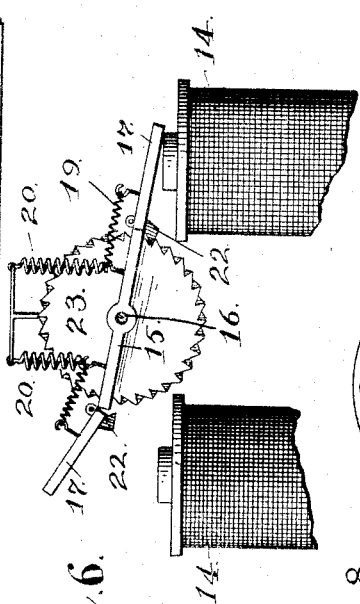
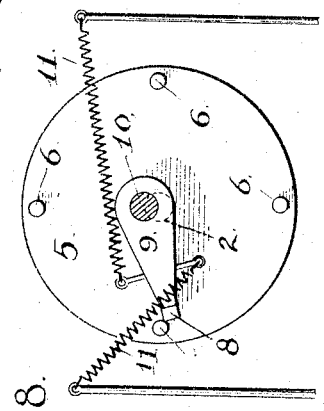
Witnesses
Arthur L. Slee
Issue Korfuker
Inventor
R. H. Sterling,
By F. M. Wright,
Attorney

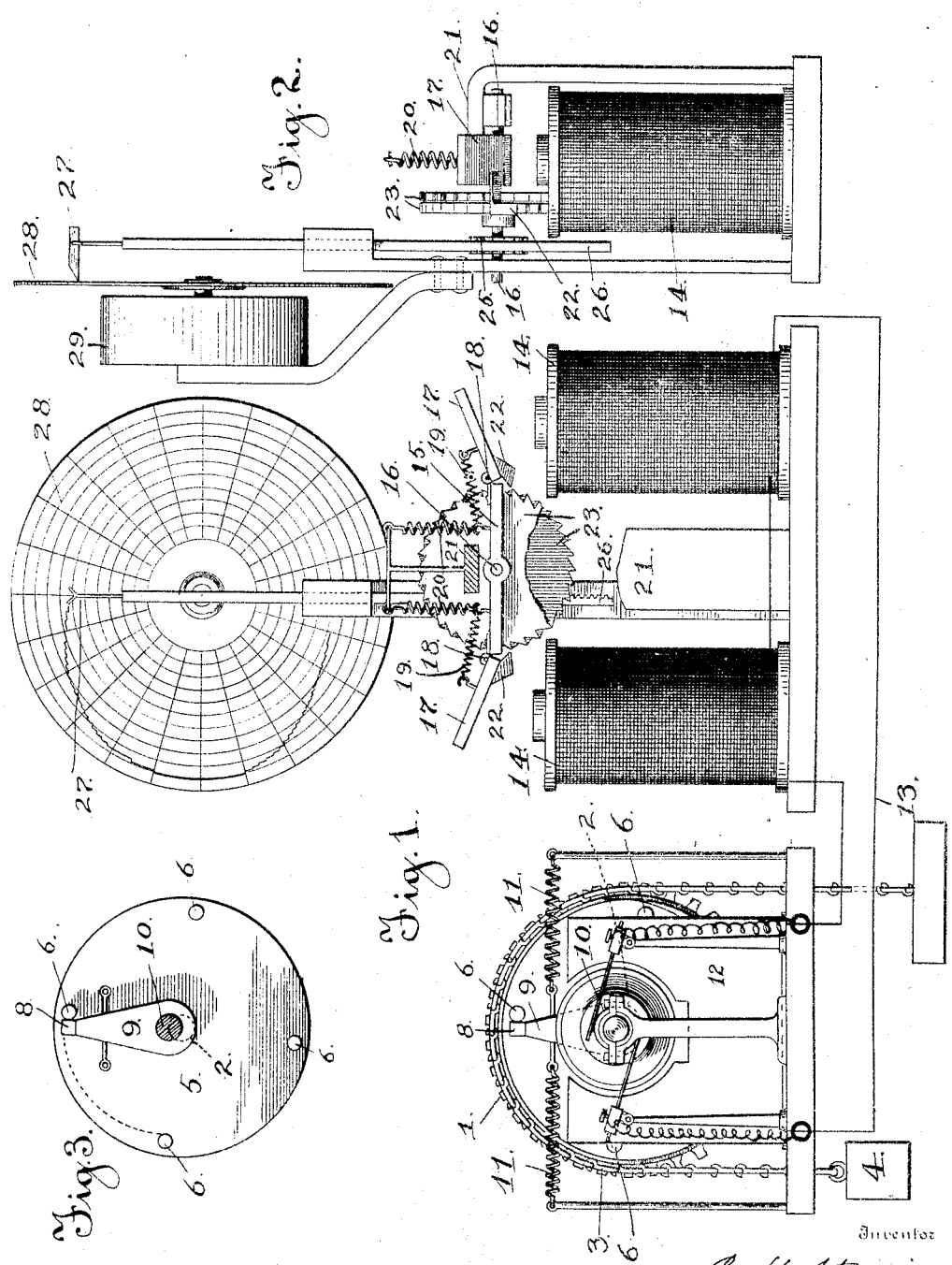

UNITED STATES PATENT OFFICE.

RICHARD H. STERLING, OF WATSONVILLE, CALIFORNIA.

LONG-DISTANCE RECORDING INDICATOR FOR RECIPROCATING DEVICES.

No. 880,592.     Specification of Letters Patent.     Patented March 3, 1908.

Application filed September 29, 1905. Serial No. 280,590.

*To all whom it may concern:*

Be it known that I, RICHARD H. STERLING, a citizen of the United States, residing at Watsonville, in the county of Santa Cruz and State of California, have invented certain new and useful Improvements in Long-Distance Recording Indicators for Reciprocating Devices, of which the following is a specification.

The object of the present invention is to provide a long distance recording indicator for gas holders, reservoirs, tide and river levels and the like. Where gas holders, reservoirs, oil tanks, etc., are located at distant points, a device to indicate the amounts contained in such storage places is always found useful. An electric call bell is the simplest, but this only serves as an alarm to tell when the holder or reservoir is either full or empty, and is sometimes confusing, when both high and low contact points are used, on account of the difficulty of determining whether the bell is ringing for the high or the low level. The object of the present invention is to provide an apparatus which will not only indicate every substantial change in level thereof when either rising or falling but will also record it on a sheet of paper, so that at a glance the amount of gas or other commodity which was held in storage, or the level at the distant points, can be ascertained at any hour of the day.

In the accompanying drawing, Figure 1 is a front elevation of the apparatus; Fig. 2 is a side view of the recorder; Fig. 3 is an enlarged sectional view of a portion of the transmitter; Fig. 4 is a side view of the transmitter; Fig. 5 is a rear view of a portion of the recorder; Fig. 6 is a broken front view of the same showing the parts in a different position from that in Fig. 1; Fig. 7 is a broken top plan view; Fig. 8 is a sectional view of a portion of the transmitter, showing the parts in their positions at the end of the movement and just before springing back and producing an impulse.

The apparatus briefly described consists of an electric circuit, a transmitter at one end of the line, to send impulses of electric current generated or controlled by the movement to be recorded, and an indicator and recorder at the other end of the line, whereby said currents are utilized to cause an arm to move in one of two directions and thus make a record on a strip of paper continuously moved by clockwork.

Referring to the drawing, 1 represents a sprocket wheel on a shaft 2 carrying a chain 3, one end of the chain being attached to a suitable weight 4, and the other end being attached to the holder, float, or other device not shown, the reciprocating motion of which it is required to record. To the end of the shaft 2 is rigidly attached a disk 5 having four projecting pins 6 placed at equal distances from each other. As the sprocket shaft slowly revolves, owing to the motion of the float or gas holder, one of the pins 6 comes in contact with a square projecting pin 8 on a crank 9 fastened to an armature shaft 10, and thereby said crank 9 is itself carried in the same direction of rotation as the disk, but revolving so slowly generates no perceptible flow of current in the armature and will not affect the armature of the recording instrument hereafter to be described. Said armature shaft 10 is arranged eccentric with the sprocket wheel shaft 2, so that, the pin 8 on the armature crank not describing the same circle as the pin 6 on the disk, after making a quarter of a revolution the pin 8 escapes from the pin 6, and the crank is released and is no longer carried forward by the disk pin. Upon being thus released it is suddenly returned to its original upright position by that one of two springs 11, which was brought into tension by this revolution through a quarter of a circle. The armature oscillates between permanent field magnets 12, and therefore this quick action of the armature in returning to its original position generates a strong impulse of electric current through the armature and through an electric circuit 13. On its return movement, its momentum would carry it past its original position and quickly oscillating back in the first direction again would generate a current in the wrong direction, but this is prevented by the abutment of the pin 8 against another one of the pins 6. This action is repeated as the disk revolves through each quarter of a revolution, and in each complete revolution of the disk generates four distinct and separate impulses of current in the armature, producing currents in one direction when the disk is revolving to the right and in another direction when revolving to the left, these different directions of the currents being necessary to the proper action of the indicator, which will be now described. The wire of the electric circuit at the other end of the line passes around an electro-magnet 14, which is thereby energized and attracts an armature which is in three parts, a central part 15 revolving loosely upon a shaft 16, and two terminal parts 17 hinged to the central part, as shown at 18. Said terminal parts are slightly tilted upwards by small spiral springs 19 attached to said terminal parts and to the central part. The central part is normally retracted by means of coiled springs 20, more powerful than the springs 19. The armature is polarized by a strong permanent magnet 21 extending above it, thus producing with the electro-magnet a polarized system.

Attached to the two hinged portions of the armature are pawls 22 which respectively engage with the teeth of two ratchet wheels 23, which are both rigidly fastened on the same shaft 16, but have their teeth arranged in opposite directions. Therefore, when an impulse of current arrives from the transmitter, and magnetizes the two cores of the electro-magnet, since the armature itself is permanently magnetized, it becomes selective as to the direction of its swing, and will, of course, be attracted at one end to the core that is temporarily magnetized in opposite polarity thereto and repelled at the other end, thus bringing it into the position shown in Fig. 6. Since the small spiral springs 19 are of less tension than the springs 20, the hinged terminal portion 17 of the armature at the attracted end is first drawn down, bringing this end of the armature into alinement with the main or central portion thereof, and this movement swings the pawl 22 into a tooth of the ratchet wheel, and then the continued movement of the armature advances the ratchet wheel the space of one tooth. On the interruption of the current the armature assumes its normal position. Should the current be received from the transmitter in the opposite direction, due to an opposite direction of rotation of its armature, then the armature of the receiver would swing in the opposite direction and cause a partial rotation of the ratchet wheels also in the opposite direction.

Upon the shaft 16 is secured a pinion 25, which, by the rocking of the shaft in one direction or the other in the manner above explained, imparts a reciprocating movement to a rack 26, which carries a pen 27, the movement of which pen is recorded in a curved or irregular line upon a sheet of paper 28 caused to travel at a regular rate by a clock work mechanism 29.

I claim:—

1. In an apparatus of the character described, the combination of a reciprocating device, an electric circuit, means operated by the reciprocation of said device for generating an electric impulse in said circuit, positive or negative dependently upon the direction of movement of said device, means for continuously advancing a recording sheet, an instrument for marking said sheet, and means for moving said instrument actuated by the passage of said current, the direction of movement of said instrument depending upon the direction of the current, substantially as described.

2. In an apparatus of the character described, the combination of a reciprocating device, an electric circuit, means for generating a current in said circuit, a pair of springs for rotating said generating means, means for energizing said springs selectively operated by the movement of said reciprocating means in either direction, means for releasing said energizing means after the reciprocating means has moved through a predetermined distance, and recording means correspondingly actuated in either direction by the current so generated, substantially as described.

3. In an apparatus of the character described, the combination of a reciprocating device, an electric circuit, a dynamo for generating an electrical impulse in said circuit, means operated by the movement of said reciprocating device for imparting a rotary movement to the dynamo shaft comprising a disk having pins thereon, and an arm on the dynamo shaft, said arm having a part adapted to engage said pins in succession, said shaft and disk being so arranged that said part when in its normal position is engaged by one of the pins on the disk when the latter commences to rotate, but is automatically removed therefrom after a predetermined extent of rotation of the disk, a spring for returning the arm to its normal position, a recording device, and means operated by the electrical impulse so produced for actuating said recording device, substantially as described.

4. In an apparatus of the character described, the combination of a reciprocating device, an electric circuit, a dynamo for generating an electrical impulse in said circuit, a shaft rotated by the reciprocation of said device, a disk on said shaft, pins on said disk, the shaft of the dynamo being out of alinement with the shaft rotated by said reciprocating device, a crank arm on said dynamo shaft, a part carried by said crank arm and engaged by said pins in succession, springs connected to opposite sides of said crank arm to restore it to its normal position, a recording device, and means actuated by the electrical impulse generated for actuating said recording device, substantially as described.

5. In an apparatus of the character described, the combination of, clock work mechanism for advancing said sheet, a marker for a recording sheet, means for moving said marker transversely to the direction of movement of the recording sheet, comprising a polarized armature operatively connected with said marker, whereby the movement of the armature in either direction correspondingly moves the marker, a permanent magnet over said armature, electro-magnets opposed to said permanent magnets, and a transmitter at a distant point for energizing said electro-magnets, substantially as described.

6. In an apparatus of the character described, the combination of, clock work mechanism for advancing a recording sheet, a marker for said sheet, an armature operatively connected with said marker, whereby the swinging of the armature correspondingly moves the marker transversely to the direction of movement of the recording sheet, said armature comprising a central swinging portion, and terminal portions hinged thereto, springs normally retracting said hinged portions, and electro-magnets for operating upon said hinged portions, substantially as described.

7. In an apparatus of the character described, the combination of, clock work mechanism for advancing a recording sheet, a marker for said sheet a swinging armature operatively connected with said marker, a polarized system of magnets controlling said armature and comprising a pair of electro-magnets for attracting the same, means located at a distance for generating an electric impulse, and a wire leading from said distant means for passing said electric impulse through said electro-magnets, substantially as described.

In witness whereof I have hereunto set my hand in the presence of two subscribing witnesses.

RICHARD H. STERLING.

Witnesses:
E. WOODWARD,
BESSIE GORFINKEL.